United States Patent [19]

Sparks

[11] 3,746,926
[45] July 17, 1973

[54] SAFETY SYSTEM INCORPORATING A PLURALITY OF CONTROL SWITCHES

[75] Inventor: Buddy G. Sparks, Tulsa, Okla.
[73] Assignee: Frank W. Murphy Manufacturer, Inc., Tulsa, Okla.
[22] Filed: Sept. 20, 1972
[21] Appl. No.: 290,565

[52] U.S. Cl. .................. 317/9 B, 307/10 R, 335/35
[51] Int. Cl. .............................................. H02h 3/00
[58] Field of Search .................. 317/9 B; 307/10 R; 335/13, 35

[56] References Cited
UNITED STATES PATENTS
1,854,571  4/1932  Albertson ............................ 317/9 B
2,815,818  12/1957  Douglass ............................. 317/9 B Primary Examiner—James D. Trammell
Attorney—D. Paul Weaver et al.

[57] ABSTRACT

A safety system for signaling a malfunction of one of a plurality of elements in a driven instrumentality and for stopping the instrumentality. The system incorporates a control switch for each of the elements, each control switch having a signaling button that is movable between a retracted inactive position with respect to a case of the control switch and a projecting signaling position with respect to the case. A safety switch, which opens in response to a malfunction, is provided for each of the elements. Circuitry in the system linking the control switches, the instrumentality and the safety switches enables the instrumentality to operate when the buttons of all of the control switches are in their inactive positions, and all of the safety switches are closed. The opening of a safety switch, responsive to a malfunction, causes the button of the control switch associated with the open safety switch to move to its signaling position and causes the instrumentality to stop.

13 Claims, 6 Drawing Figures

Patented July 17, 1973

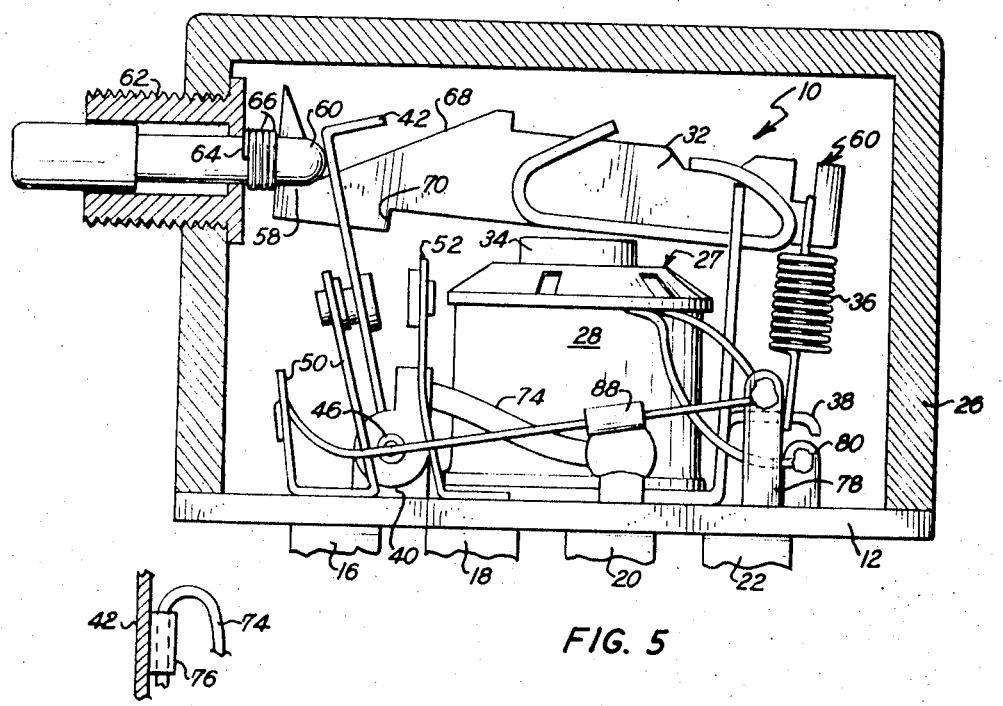
FIG. 5
FIG. 4
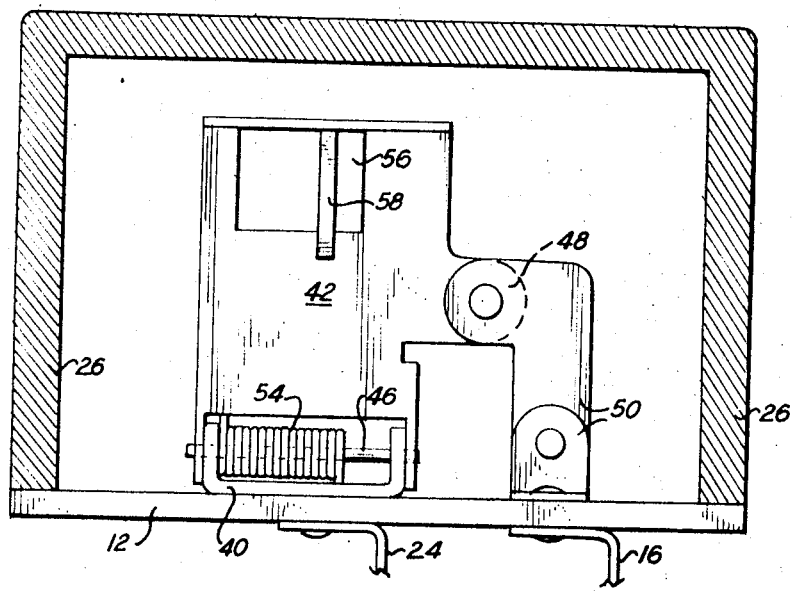
FIG. 3

SAFETY SYSTEM INCORPORATING A PLURALITY OF CONTROL SWITCHES

BACKGROUND OF THE INVENTION

In operating an instrumentality, it is desirable to provide a system to stop the instrumentality in the event of a malfunction of one of the elements of the instrumentality and to provide a signaling arrangement which will indicate the source of the malfunction. It is also desirable that the system be "fail safe" in that the instrumentality cannot operate in the event of a failure in the signaling arrangement. While the prior art, as exemplified by U.S. Pats. Nos. 1,097,680 and 2,740,953, shows signaling devices that are "fail safe" in that a signal is created in response to the opening of a circuit, it does not show a signaling arrangement having a desired reliability and flexibility.

SUMMARY OF THE INVENTION

In accordance with a first aspect of this invention, a safety system is provided for signaling the malfunction of one of a plurality of elements in a driven instrumentality and for stopping the instrumentality. The system includes a control switch and a safety switch for each of the elements, each safety switch being openable in response to a malfunction in its associated element. Each control switch includes a signaling device movable between an inactive position and a signaling position. A first electrical circuit extends from a power source through the control switches to the instrumentality to operate the instrumentality when all of the signaling devices are in their inactive positions. A second electrical circuit extends from the power source through each of the safety switches and from each safety switch to its associated control switch. The control switches and the first and second electrical circuits are so constituted that all of the signaling devices are in their inactive positions when the first circuit and all of the second circuits are closed and an opening of a particular one of the safety switches operates to open the first circuit in the control switch associated with the open safety switch to stop the instrumentality and operates to move the signaling device of the control switch associated with the open safety switch to its signaling position. A third electrical circuit interconnects the control switches, and the control switches and the third electrical circuit are so constituted that the remaining signaling devices are retained in their inactive positions when the particular safety switch is opened. Thus, an opening of the particular safety switch causes a shutdown of the instrumentality and also causes only the signaling device that is associated with the open safety switch to be moved to its signaling position to signal the source of the malfunction.

A second aspect of this invention relates to the construction of the control switches. Each control switch has a solenoid formed of a coil and a core that is magnetized in response to current flow through the coil. An armature is movably mounted to the control switch for movement between a first armature position wherein the armature is attracted to and bears against the core and a second armature position wherein the armature is spaced from the core when no current is flowing through the coil. An arm is movably mounted on the switch between a first arm position in which it is latched to the armature when the armature is in its first armature position and a second arm position when the armature is in the second armature position. The signaling device takes the form of a button that is movable in a case enveloping the control switch and that is in registry with the arm. When the arm is in its first arm position, the button is in engagement with the arm with the button in its inactive position, and a movement of the arm to the second arm position causes a movement of the button to its signaling position.

BRIEF DESCRIPTION OF THE DRAWING

FIG. 3 is a view taken on the line 3—3 of FIG. 1;

FIG. 4 is a view taken on the line 4—4 of FIG. 1;

FIG. 5 is a section of the control switch, similar to FIG. 1, but showing the armature in its second armature position, the arm in its second arm position, and the button in its signaling position.

DESCRIPTION OF THE PREFERRED EMBODIMENT

Figure 1:
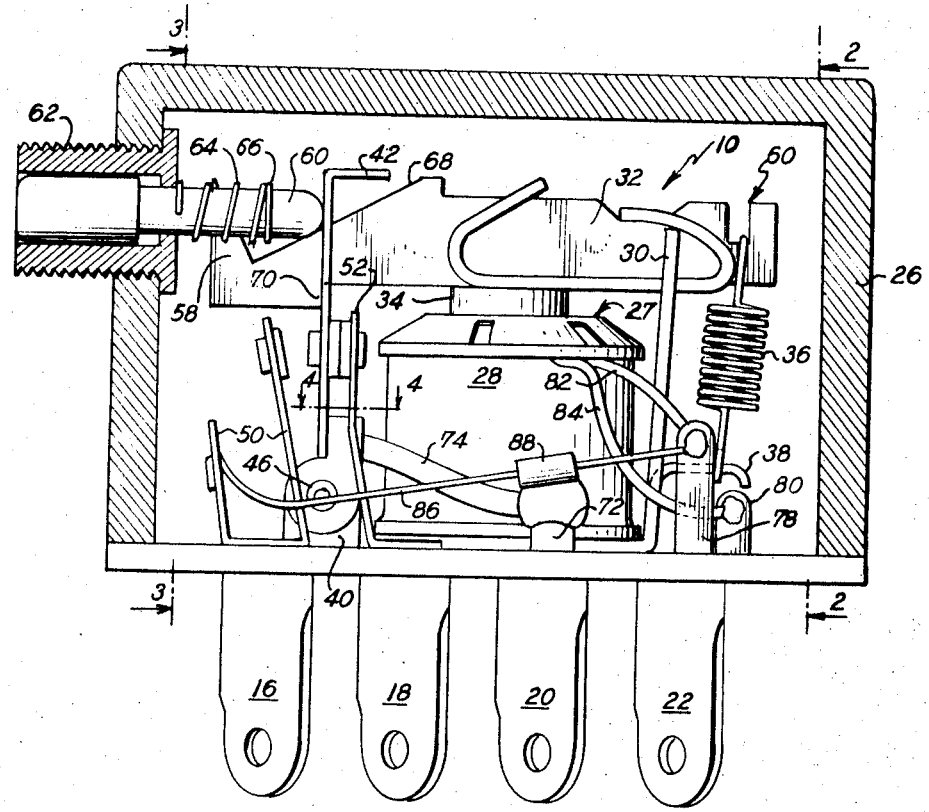
FIG. 1 is a section of the control switch showing the armature in its first armature position, the arm in its first arm position, and the button in its inactive position.
Figure 2:
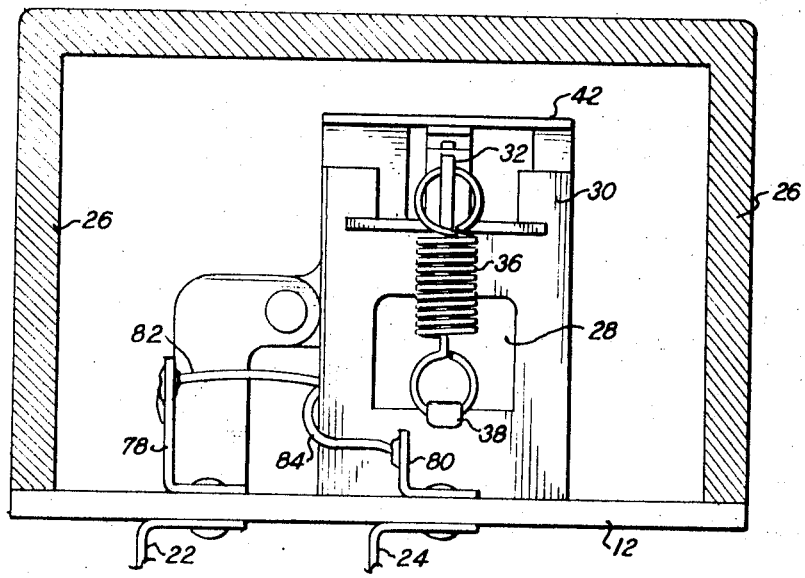
FIG. 2 is a view taken on the line 2—2 of FIG. 1.

The control switch 10, as shown in FIGS. 1 and 5, includes a base 12 of electrically insulative material on which the switch components are mounted. Terminals 16, 18, 20, 22 and 24 (FIG. 2) are mounted to the base 12 and extend downwardly thereof. A case 26 is secured to the base 12 and extends upwardly thereof, the case 26 enveloping those components of the switch, described below, that extend upwardly of the base 12.

A solenoid 27, formed of a coil 28 and a core 34, is mounted to the base 14 and extends upwardly thereof. A stand 30 is mounted to and extends upwardly of the base 12 rearwardly of the coil 28. An armature 32 is pivotally mounted to the stand 30 in such a manner that a median portion of the armature, that extends forwardly of the stand 30, overhangs the core 34 and is movable towards and away from the core. A tension spring 36, interposed between a hook 38 on the stand 30 and the back of the armature 32, yieldably urges the median portion of the armature 32 away from the core 34.

A clevis 40 (see FIG. 3) is mounted to the base 12 forwardly of the coil 28 and an arm 42 is pivoted on a pin 46 mounted to the clevis 40 for swinging movement toward and away from the coil 28. The arm 42 has a finger 48 that is movable between a leaf contact 50 that is in electrically conductive connection with the terminal 16 and a leaf contact 52 that is in electrically conductive connection with the terminal 18. A coil spring 54, that is entwined about the pin 46 and has ends bearing against the arm 42 and the clevis 40, yieldably urges the arm 42 forwardly away from the coil 28.

The front of the armature 32 extends through an aperture 56 in the arm 42. An upwardly extending stop shoulder 58 on the top surface of the armature 32 is engageable with the top surface of the aperture 56 to limit the extent of forward movement of the arm 42 under the influence of the spring 54 to a position, shown in FIG. 5, wherein the finger 48 engages the contact 50 when the front of the armature is in a raised position under the influence of the spring 36.

A button 60 is movably mounted in a ferrule 62 in the case 14 for forward-rearward movement. The button 60 is located forwardly of and in alignment with the arm 42 and is yieldably urged rearwardly towards the arm 42 by a spring 64 that is interposed between the ferrule 62 and a collar 66 mounted on the button. The rearward movement of the button 60, in the manner described below, causes the button to bear against the arm 42 and move the arm 42 rearwardly from the FIG. 5 position wherein the finger 48 engages the contact 50. The rearward movement causes the top surface of the aperature 56 to move along a rearwardly and upwardly inclined upper surface 68 on the armature 32 to thus cam the armature downwardly about the pivotal connection between the armature and the stand 30 against the force of the spring 36 until the bottom surface of the aperture 56 is rearward of a shoulder 70 on the bottom surface of the armature. When the coil 28 is energized, as described below, the coaction between the shoulder 70 and the bottom surface of the aperture 56 acts as a latch to retain the armature 32 in the FIG. 1 position wherein the finger 48 engages the leaf contact 52.

A contact 72, that is in electrically conductive connection with the terminal 20, is mounted to and extends upwardly of the base 12. An electrically conductive wire 74 extends between the contact 72 and a bracket 76 (FIG. 4) that is mounted to the arm 42 to provide an electrical current path between the arm 42 and the terminal 20.

Contacts 78 and 80, that are respectively in electrically conductive connection with the terminals 22 and 24, are mounted to and extend upwardly of the base 12. Wires 82 and 84, at the ends of the solenoid coil 28, are respectively connected to the contacts 78 and 80.

A wire 86, incorporating a diode 88, extends between the contacts 50 and 78. The diode 88 is so constructed as to permit current flow from the contact 50 to the contact 78 while blocking or inhibiting current flow from the contact 78 to the contact 50.

Figure 6:
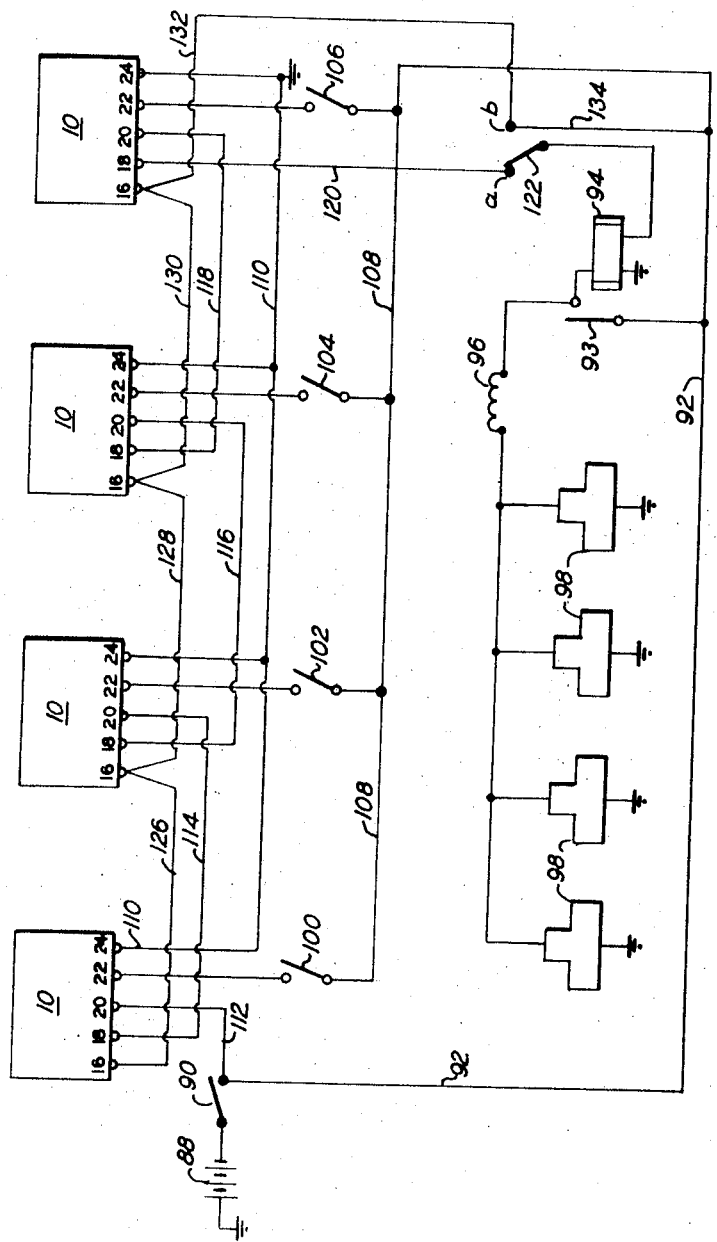
FIG. 6 is a schematic representation of the electrical circuit of the safety system.

FIG. 6 is a schematic illustration of a typical application of the control switches 10, this being a safety control panel for an instrumentality in the form of an engine driven pump wherein the control switches are utilized to indicate which of the elements of the engine or the pump have failed to cause the engine, and thus the pump, to stop. The engine is operated by supplying electricity from a power source 88 through a power switch 90, a line 92, a switch 93 of an ignition relay 94, and an ignition coil 96 to sparkplugs 98. An engine oil pressure safety switch 100, constructed to open in the event that the engine oil pressure becomes too low, is connected to the terminal 22 of a first of the control switches 10; an engine water temperature safety switch 102, constructed to open in the event that the engine water temperature becomes too high, is connected to the terminal 22 of a second of the control switches 10; a pump suction pressure safety switch 104, constructed to open in the event that the pump suction pressure becomes too low, is connected to the terminal 22 of a third of the control switches 10; and a pump discharge pressure safety switch 106, constructed to open in the event that the pump discharge pressure becomes too low, is connected to the terminal 22 of a fourth of the control switches 10. With the engine running and the safety switches 100, 102, 104, 106 and 108 closed, the solenoid coils 28 of all four control switches 10 are energized by way of current flowing from the line 92 through a line 108 and the switches 100, 102, 104, and 106 to the terminal 22 of each of the control switches 10. From each terminal 22, the current flows through the solenoid coils 28 of each control switch 10 to energize the solenoid coils, thence to the terminals 24 of the control switches 10, and from the terminals 24 to ground via a line 110, In the normal condition of the control switches 10, with the engine driven pump functioning properly, the buttons 60 of all four control switches 10 have been depressed rearwardly so that the arms 48 of all four control switches 10 are retained by the coaction of the shoulder 70 and the bottom surface of the aperture 56 in the FIG. 1 position with the finger 48 in engagement with the contact 52 to thus provide a circuit between the terminals 18 and 20 of each of the control switches 10. At this time, the spring 64 retains the button 60 in FIG. 1 position with its rearward end engaging the arm 42 and its front end within the ferrule 62. The circuit between the terminals 18 and 20 enables current to flow from the switch 90 through a line 112, the switch terminals 20 and 18 of the first of the control switches 10, a line 114, the switch terminals 20 and 18 of the second of the control switches 10, a line 116, the switch terminals 20 and 18 of the third of the control switches 10, a line 118, the switch terminals 20 and 18 of the fourth of the control switches 10, a line 120, and terminal *a* of a single pole double throw running switch 122 to the ignition relay 94 to energize the ignition relay 94 so that current may flow through the line 92 and the ignition relay switch 93, as set forth above, to the ignition coil 96 and the sparkplugs 98 of the engine.

Let us assume that, due to low oil pressure in the engine, the switch 100 opens. This causes deenergization of the solenoid coil 28 of the control switch 10 associated with the switch 100. Deenergization of the coil 28 enables the spring 36 to raise the front of the armature 32 away from the core 34 and to disengage the shoulder 70 from the bottom surface of the aperture 56 thereby enabling the spring 54 to move the arm 42 forwardly to the FIG. 5 position wherein the top surface of the aperature 56 engages the shoulder 58 and the finger 48 is disengaged from the contact 52 and is in engagement with the contact 50. The forward movement of the arm 42 to the FIG. 5 position pushes the button 60 forwardly so that its front end is projected out of the ferrule 62 to thus act as a signal. The disengagement of the finger 48 from the contact 52 opens the circuit between the switch 90 and the ignition relay 94 that includes the lines 112, 114, 116, 118, and 120 so as to deenergize the relay 94 and thus open the switch 93 to cut off the flow of current to the ignition coil 96 and the sparkplugs 98 and thereby stop the engine which, in time, causes the remaining safety switches 102, 104, and 106 to open.

The movement of the control switch 10 associated with the safety switch 100 to the FIG. 5 position enables current to flow from the line 112, through the contacts 72 and 50 and the diode 88 of this control switch 10 to the contact 78 of this switch 10 and then through the coil 28 and the terminal 24 of this control switch 10 to the line 110 to thereby again energize the solenoid coil 28 of this switch 10. However, this control switch 10 remains in the FIG. 5 position with its button 60 projecting forwardly despite the solenoid coil 28 having been energized under the force of its springs 54 with its armature 32 in its raised position away from its core 34 under the force of its spring 36.

The terminals 16 of the four control switches 10 are connected by lines 126, 128 and 130. Therefore, the current flowing into the contact 50 of the control switch 10 associated with the safety switch 100 will flow from the terminal 16 of this control switch 10, through the lines 126, 128 and 130, to the terminals 16 of the other control switches 10. From the terminals 16 of these other control switches 10 current flows through their diodes 88, their contacts 72, their coils 28, and their terminals 24 through the line 110 to ground so that the coils 28 of these other control switches 10 will remain energized after the safety switches 102, 104 and 106 have opend due to the engine shutdown to keep the buttons 60 of these other switches 10 retracted within their ferrules 62.

Similarly, the opening of safety switch 102 due to an unsafe rise in the engine water temperature, the opening of the safety switch 104 due to the lowering of the pump suction pressure, or the opening of the safety switch 106 due to the lowering of the pump discharge pressure causes the button 60 of the control switch 10 associated with the opened safety switch to be projected outwardly of its ferrule 62 while the remaining buttons 60 remain retracted within their ferrules 62.

From the foregoing, it can be seen that the construction of the control switches 10 and the circuitry of FIG. 6 provide a system wherein the control switches 10 operate to shut off the engine in the event of a malfunction causing an opening of one of the safety switches 100, 102, 104, 106 with the projecting button 60 signaling the particular malfunction. The running switch 122 may now be moved from its closed "on" position at terminal *a* to its open "off" position at terminal *b* to ensure that no current will flow to the engine ignition coil 96 and the engine sparkplugs 98 and the malfunction can be corrected. A line 132 extends from the terminal 16 of the control switch 10 associated with the safety switch 106 to the terminal *b* of the running switch 122 and a line 134 extends from this terminal *b* to the line 92. Thus, when the switch 122 is in its "off" position, current flows through the lines 132, 130, 128 and 126 to the terminals 16 of all of the control switches 10 and thence through the diodes 88, the contacts 78, the coils 28, the terminals 24 and the line 110 to ground to thereby retain all of the coils 28 energized despite the movement of the running switch 122 to its "off" position. The pushbutton 60 that had been projected out of its ferrule 62 to signal the malfunction may now be pushed rearwardly to thereby push the arm 42 rearwardly until the armature 32 is latched by the shoulder 70 in the FIG. 1 position with the core 34 of the energized coil 28 retaining the armature in the latched FIG. 1 position. After the malfunction has been corrected, the switch 122 may be moved to its "on" position to start the operation of the engine. This arrangement provides a fail safe system in that the engine cannot run unless all the circuits from the power source 88 are complete to thus ensure reliability of the control system against loose or broken electrical connections. In the event of an open circuit anywhere between the power source 88 and the lines passing through the solenoid coils 28, the engine will not function, and the buttons 60 will be projected out of their ferrules 62 to signal a malfunction.

It is noted that the energization of the coils 28 to magnetize the cores 34 do not act to move the armatures 32 downwardly against the cores, but merely retain the armatures against the cores after they have been manually forced against the cores by rearward manual movement of the buttons 60. Therefore, the system has the advantage of being able to use a relative low voltage power system.

I claim:

1. A safety system for signaling a malfunction of one of a plurality of elements in a driven instrumentality and for stopping the instrumentality comprising: a separate control switch for each of said plurality of elements; a signaling device in each of said control switches movable between an inactive position and a signaling position; a first electrical circuit extending from a power source through said control switches to said instrumentality; a safety switch associated with each of said elements adapted to open in the event of a malfunction in its associated element; a second electrical circuit extending from the power source through each of said safety switches and from each safety switch to its associated control switch; said control switches and said first and second electrical circuits being so constructed and arranged as to maintain all of the signaling devices in their inactive positions when said first circuit and all of said second circuits are closed and to cause an opening of a particular safety switch to open the first circuit in the control switch associated with the open safety switch and to move the signaling device associated with said particular safety switch from its inactive to its signaling position; and a third electrical circuit interconnecting the control switches; said control switches and said third electrical circuit being so constructed and arranged that the remaining signaling devices are retained in their inactive positions when said particular safety switch is opened.

2. The system according to claim 1 wherein the control switches are so constructed that the signaling devices are manually movable from their signaling to their inactive positions; and wherein the control switches and said third electrical circuit are so constructed and arranged that the signaling device in its signaling position is retained in its inactive position when it is moved to its inactive position from its signaling position.

3. The system according to claim 2 further comprising: an instrumentality running switch, interposed in said first circuit between the control switches and the instrumentality, movable between a closed position wherein the instrumentality may be operated and an open position wherein the instrumentality is precluded from operation; and wherein the instrumentality running switch and the third electrical circuit are so constructed and arranged that the signaling device in its signaling position is retained in its inactive position when it is moved to its inactive position from its signaling position regardless of whether the running switch is in its closed or open position.

4. The system according to claim 1 wherein a case envelopes at least a part of each of said control switches; and wherein each of said signaling devices comprises a button movably mounted in each of said cases between a retracted position wherein it is in said inactive position and a projecting position wherein it is in said signaling position.

5. The system according to claim 4 wherein each of said buttons is manually movable from its projecting position to its retracted position; and wherein the control switches and said third electrical circuit are so constructed and arranged that the button in its projecting position is retained in retracted position when it is moved to its retracted position from its projecting position.

6. The system according to claim 5 further comprising: an instrumentality running switch, interposed in said first circuit between the control switches and the instrumentality, movable between a closed position wherein the instrumentality may be operated and an open position wherein the instrumentality is precluded from operation; and wherein the instrumentality running switch and the third electrical circuit are so constructed and arranged that the button in its projecting position is retained in its retracted position when it is moved to its retracted position from its projecting position regardless of whether the running switch is in its closed or open position.

7. The system according to claim 1 wherein each of said control switches comprises: a first terminal, a second terminal, a third terminal, a fourth terminal and a fifth terminal; a solenoid having a coil and a core; a first electrically conductive means interposed between said fourth terminal and one end of said coil; a second electrically conductive means interposed between said fifth terminal and the other end of said coil; an armature movably mounted between a first armature position wherein the armature is attracted to and bears against the core pursuant to electric current flowing through the coil and a second armature position wherein the armature is spaced from the core when no electric current is flowing through the coil; a first spring means yieldably urging the armature to said second armature position; a first contact in electrically conductive connection with said first terminal; a second contact spaced from said first contact, in electrically conductive connection with said second terminal; an arm, having a finger located between said contacts, mounted for movement between a first arm position wherein the finger is in engagement with said second contact and a second arm position wherein the finger is in engagement with said first contact; a second spring means yieldably urging the arm to said second arm position; cooperative latching means on said armature and said arm so constructed and arranged as to retain the arm in said first arm position when the armature is in said first armature position and to permit movement of the arm to said second arm position under the influence of said second spring means when the armature is moved from said first armature position to said second armature position under the influence of said first spring means; stop means inteposed between said armature and said arm to retain the arm in said second arm position when the arm is moved to said second arm position under the influence of said second spring means; a third electrically conductive means interposed between said third terminal and said arm; a fourth electrically conductive means interposed between said first terminal and said first electrically conductive means so constituted as to permit current flow from said first terminal to said first electrically conductive means and to inhibit current flow from said first electrically conductive means to said first terminal; a case enveloping at least a part of the control switch; a button, in registry with the arm, mounted to the case for movement between a first button position wherein the button is retracted with respect to the case and wherein the button is in engagement with the arm while the arm is in said first arm position and a second button position wherein the button is projecting with respect to the case and wherein the button is in engagement with the arm while the arm is in said second arm position, said button constituting said signaling device, said first button position constituting said inactive position of the signaling device, and said second button position constituting said signaling position of the signaling device; and a third spring means yieldably urging the button to said first button position; wherein said first electrical circuit comprises: an electrical connection between said power source and the third terminal of a first of said control switches; an electrical connection between the second terminal of a second of said control switches and said instrumentality; and electrical connections extending in series between the second terminals of each of the control switches, excepting said second control switch, and the third terminal of another control switch; wherein said second electrical circuit comprises: an electrical connection between each of said safety switches and the fourth terminal of its associated control switch; and an electrical connection between the fifth terminal of each control switch and the power source; and wherein said third electrical circuit comprises: electrical connections extending in series between the first terminals of each of the control switches.

8. The system according to claim 7 further comprising: an instrumentality running switch, interposed in said first circuit between the control switches and the instrumentality, movable between a closed position wherein the instrumentality may be operated and an open position wherein the instrumentality is precluded from operation; and wherein said third electrical circuit comprises: an electrical connection between one of said first terminals and the power source when the running switch is in said open position.

9. A control switch comprising: a first terminal, a second terminal, a third terminal, a fourth terminal, and a fifth terminal; a solenoid having a coil and a core; a first electrically conductive means interposed between said fourth terminal and one end of said coil; a second electrically conductive means interposed between said fifth terminal and the other end of said coil; an armature movably mounted between a first armature position wherein the armature is attracted to and bears against the core pursuant to electric current flowing through the coil and a second armature position wherein the armature is spaced from the core when no electric current is flowing through the coil; a first spring means yieldably urging the armature to said second armature position; a first contact in electrically conductive connection with said first terminal; a second contact, spaced from said first contact, in electrically conductive connection with said second terminal; an arm, having a finger located between said contacts, mounted for movement between a first arm position wherein the finger is in engagement with said second contact and a second arm position wherein the finger is in engagement with said first contact; a second spring means yieldably urging the arm to said second arm position; cooperative latching means on said armature and said arm so constructed and arranged as to retain the arm in said first arm position when the armature is in said first armature position and to permit movement of the arm to said second arm position under the influence of said second spring means when the armature is moved from said first armature position to said second armature position under the influence of said first spring means; stop means interposed between said armature and said arm to retain the arm in said second arm position wnen the arm is moved to said second arm position under the influence of said second spring means; a third electrically conductive means interposed between said third terminal and said arm; a fourth electrically conductive means interposed between said first terminal and said first electrically conductive means so constituted as to permit current flow from said first terminal to said first electrically conductive means and to inhibit current flow from said first electrically conductive means to said first terminal; a case enveloping at least a part of the control switch; a button, in registry with the arm, mounted to the case for movement between a first button position wherein the button is retracted with respect to the case and wherein the button is in engagement with the arm while the arm is in said first arm position and a second button position wherein the button is projecting with respect to the case and wherein the button is in engagement with the arm while the arm is in said second arm position; and a third spring means yieldably urging the button to said first button position.

10. The switch according to claim 9 wherein said fourth electrically conductive means is comprised of a diode.

11. The switch according to claim 9 further comprising: a base; means mounting the solenoid to the base; a stand mounted to and extending upwardly of the base rearwardly of the solenoid; means pivotally mounting the armature to the stand so that a median portion of the armature extends forwardly of the stand and overhangs the core and the back of the armature extends rearwardly of the stand; means mounting the first spring means so that it extends between the back of the armature and the stand; an aperture in said arm through which the front of the armature extends; a first shoulder on the bottom surface of the armature, said first shoulder coacting with the bottom surface of the aperture to constitute said latching means; and a second shoulder on the top surface of the armature, located forwardly of said first shoulder, said second shoulder coacting with the top surface of the aperture to constitute said stop means.

12. The switch according to claim 9 further comprising: a bracket mounted to said arm; and a third contact in electrically conductive connection with said third terminal; and wherein said third electrically conductive means comprises a wire extending between said bracket and said third terminal.

13. The switch according to claim 9 further comprising: a third contact forming said first electrically conductive means, in electrically conductive connection with said fourth terminal to which said one end of the coil is connected; and wherein said fourth electrically conductive means is comprised of a wire, incorporating a diode, that extends between said first contact and said third contact.

* * * * *